(12) United States Patent
Swartz

(10) Patent No.: US 10,034,457 B2
(45) Date of Patent: Jul. 31, 2018

(54) E-DOG TRAINING MAT

(71) Applicant: JSW Pet Products, LLC, Phoenix, AZ (US)

(72) Inventor: Jenna Swartz, Phoenix, AZ (US)

(73) Assignee: JSW Pet Products, LLC, Phoenix, AZ (US)

( * ) Notice: Subject to any disclaimer, the term of this patent is extended or adjusted under 35 U.S.C. 154(b) by 0 days.

(21) Appl. No.: 15/435,909

(22) Filed: Feb. 17, 2017

(65) Prior Publication Data

US 2017/0238506 A1    Aug. 24, 2017

Related U.S. Application Data

(60) Provisional application No. 62/296,984, filed on Feb. 18, 2016.

(51) Int. Cl.
*G08B 23/00* (2006.01)
*A01K 15/02* (2006.01)
*G08B 21/18* (2006.01)

(52) U.S. Cl.
CPC ............ *A01K 15/021* (2013.01); *G08B 21/18* (2013.01)

(58) Field of Classification Search
CPC ................................ G08B 21/18; A01K 15/21

USPC ...................................................... 340/573.3
See application file for complete search history.

(56) References Cited

U.S. PATENT DOCUMENTS

| | | | |
|---|---|---|---|
| 2005/0040954 A1* | 2/2005 | McNally ................ | A01K 1/035 340/573.3 |
| 2007/0125312 A1* | 6/2007 | Boyd .................... | A01K 1/0353 119/721 |
| 2011/0260873 A1* | 10/2011 | Ouchi .................. | A61B 5/0002 340/573.3 |
| 2015/0327514 A1* | 11/2015 | Clark .................... | A01K 15/021 119/57.92 |
| 2017/0042121 A1* | 2/2017 | Jersa, III .............. | A01K 15/023 |
| 2017/0196195 A1* | 7/2017 | Wisdom ................ | A01K 1/035 |

\* cited by examiner

*Primary Examiner* — Joseph Feild
*Assistant Examiner* — Sharmin Akhter
(74) *Attorney, Agent, or Firm* — Knechtel, Demeur & Samlan

(57) ABSTRACT

An electronic sensing device used to detect the presence of a pet thereon and emit a communication through an audio alert or notification to the pet's owner of the pet's need to leave the house or go outside through a selected pre-programmed audio sound produced through speakers or a wireless notification (e.g., such as a push notification, e-mail, or any other type of wireless notification) transmitted to a smart phone or other electronic device (e.g., software program or application, etc . . . ); or one or both, as desired.

17 Claims, 10 Drawing Sheets

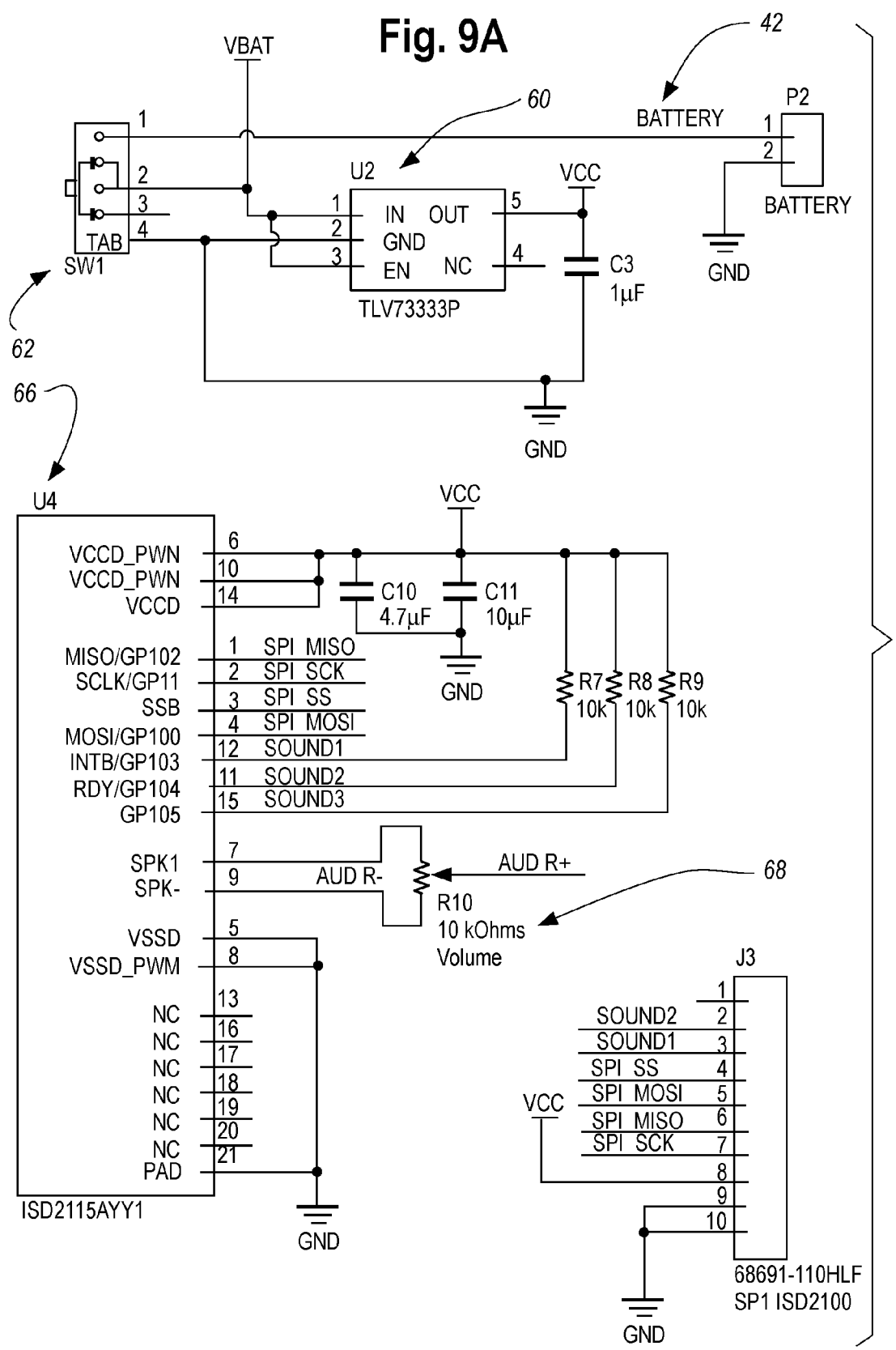

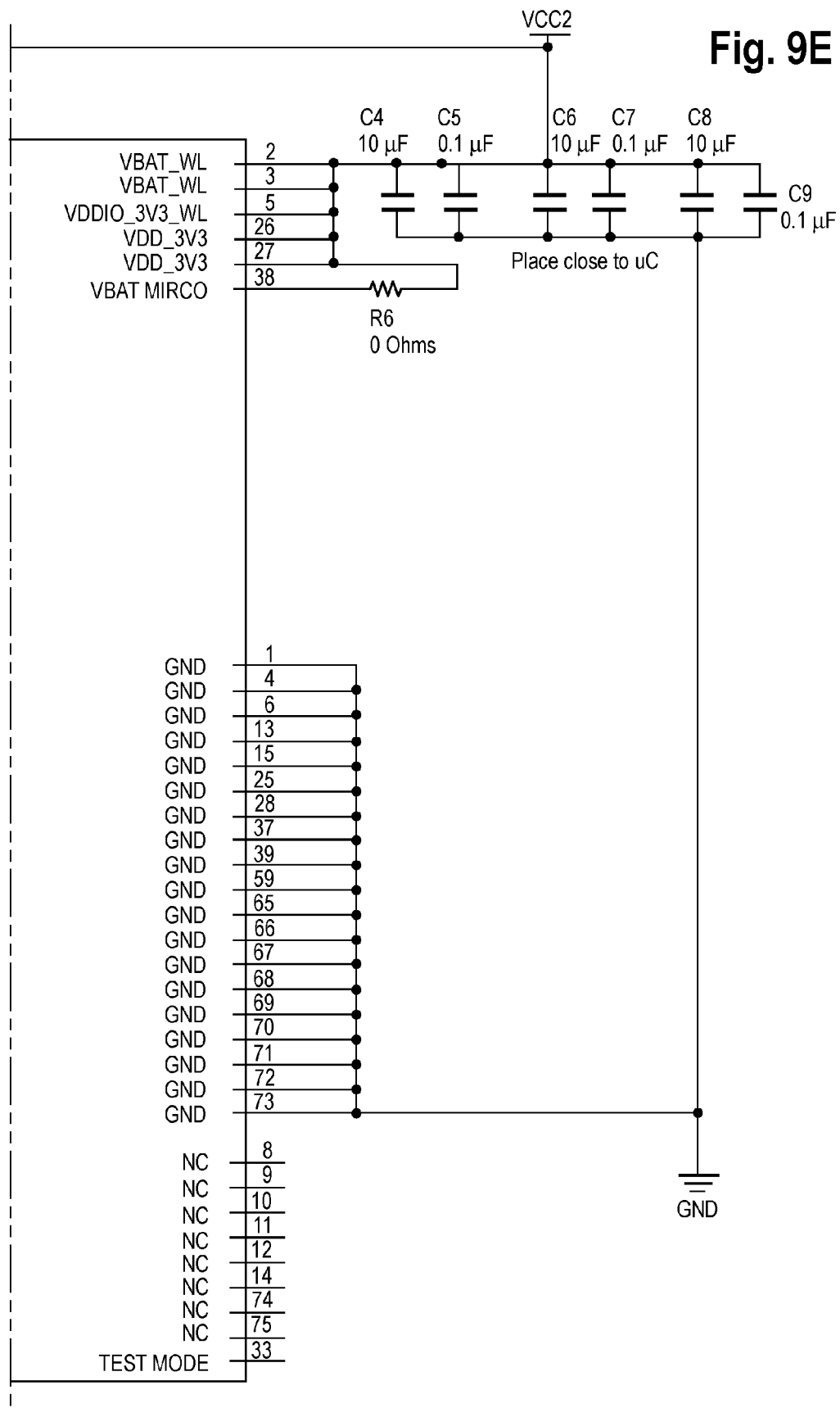

E-DOG TRAINING MAT

I. CROSS-REFERENCE TO RELATED APPLICATION

This patent application is a non-provisional application claiming priority from U.S. Provisional Patent Application Ser. No. 62/296,984, entitled "E-Dog Training Mat", filed on Feb. 18, 2016, and is fully incorporated herein by reference.

I. FIELD OF THE INVENTION

The present invention relates to a device and system to train and condition domestic pets on how to alert owners that the pet needs to leave the house or go outside.

II. DESCRIPTION AND BACKGROUND OF THE INVENTION

In today's world, there exist many different devices and/or apparatus and systems and publications for training domestic pets. One particular issue that always confronts owners of pets is house training or housebreaking the pet. For example, when a pet needs leave the house or go outside to eliminate or relieve themselves, one common practice is for the pet to sit by the doorway and bark to the owner. Younger pets, however, lack the consistency and are generally unaware of the need, during this process, to bark. And, even when they do bark, sometime the sound is often too quiet to notice depending upon the location of the owner in the house.

From Applicant's perspective, the success of the house training or housebreaking relies upon communication between the owner and the pet. For owners, each with varying degrees of experience with pets and for the pets, each with varying degrees of age and intelligence, Applicant has invented a device that transcends any such difficulties into a simple to use and effective device. Applicant's device is an opportunity for owners to train their pets quicker and provides a consistent method and location for pets to indicate that they need to be let outside.

Applicant's inventive device is a unique system that enables domestic pet(s) the ability to communicate with their owner through an alert and notification, by way of an audio sound or wireless notification through a smart phone (e.g., such as a push notification, or software program or application, etc. . . . ) to facilitate leaving the house or going outside.

Thus, there is a need and there has never been disclosed Applicant's electronic sensing device used to detect the presence of a pet thereon and emit a communication (through an alert or other notification) to the pet's owner of the pet's need to leave the house or go outside.

III. SUMMARY OF THE INVENTION

The present invention is an electronic sensing device used to detect the presence of a pet thereon and emit a communication through an audio alert or notification to the pet's owner of the pet's need to leave the house or go outside through a selected pre-programmed audio sound produced through speakers or a wireless notification (e.g., such as a push notification, e-mail, or any other type of wireless notification) transmitted to a smart phone or other electronic device (e.g., software program or application, etc. . . . ); or one or both, as desired.

IV. BRIEF DESCRIPTION OF THE DRAWINGS

The Description of the Preferred Embodiment will be better understood with reference to the following figures:

FIGS. 9A through 9E are the electrical schematics in connection with the operation of the printed circuit board of Applicant's device.

V. DETAILED DESCRIPTION OF THE PREFERRED EMBODIMENT

Figure 1:
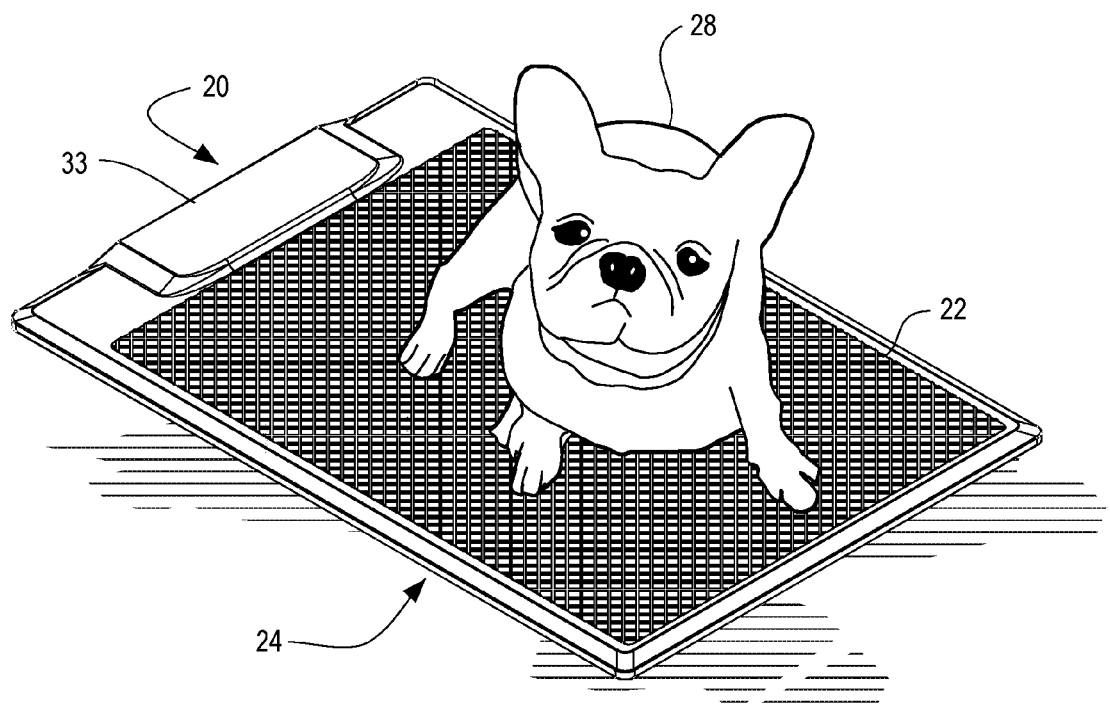
FIG. 1 is a perspective view, as viewed from the top, of Applicant's inventive device and further illustrating use by a pet thereon.
Figure 2:
FIG. 2 is a side view of Applicant's inventive device.

Turning first to FIGS. 1 and 2, there is illustrated Applicant's device 20. The device 20 comprises a top panel 22, a bottom panel 24, and a plurality of feet 26. Also, as described in more detail below in connection with the system and/or use of the device 20, a pet 28 is illustrated as standing on the top panel 22. In the preferred embodiment, the device 20 can be made of any material known to one skilled in the art that is available to accomplish the invention described herein.

Figure 3:
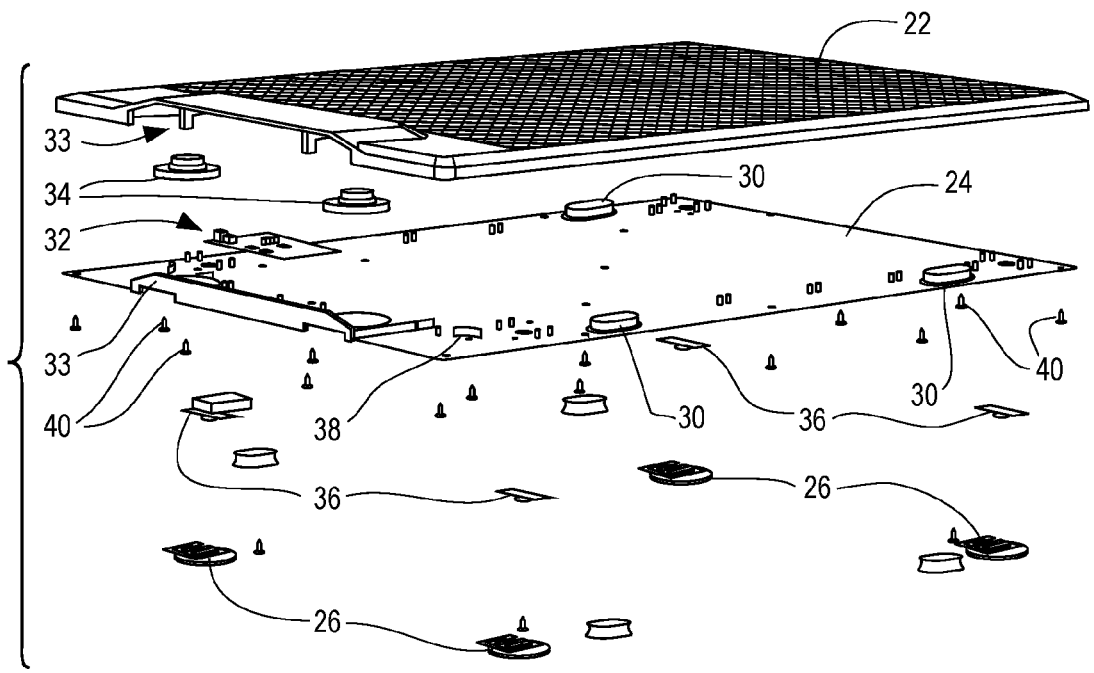
FIG. 3 is an exploded perspective view of Applicant's inventive device illustrating the top panel, the bottom panel, and the components used in connection therewith.
Figure 4:
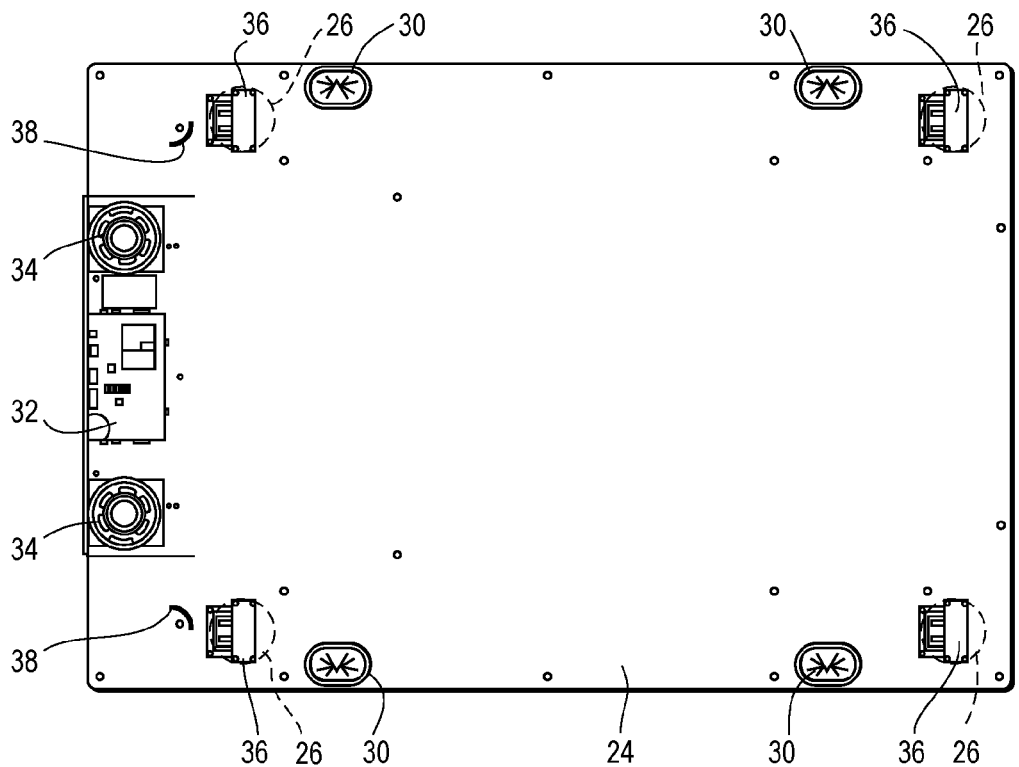
FIG. 4 is a top view of the bottom panel of Applicant's inventive device and the components used in connection therewith.

Turning to FIGS. 3 and 4, the device 20 is shown in an exploded view with the top panel 22, the bottom panel 24, and the plurality of feet 26 separated to illustrate the various other components used in connection with the device 20. In the preferred embodiment, these components comprise a plurality of pad inserts 30, a main printed circuit board 32, a housing 33 for the main printed circuit board 32 (see also FIG. 1), speakers 34, a printed circuit board 36 associated with each of the plurality of feet 26, directional walls 38, and a plurality of fasteners 40.

One of each of the plurality of pad inserts 30 is situated adjacent to one of each of the plurality of feet 26, between the top panel 22 and bottom panel 24. In the preferred embodiment, the plurality of pad inserts 30 are designed to provide support between the top panel 22 and the bottom panel 24 and some protection for the plurality of feet 36.

Figure 8:
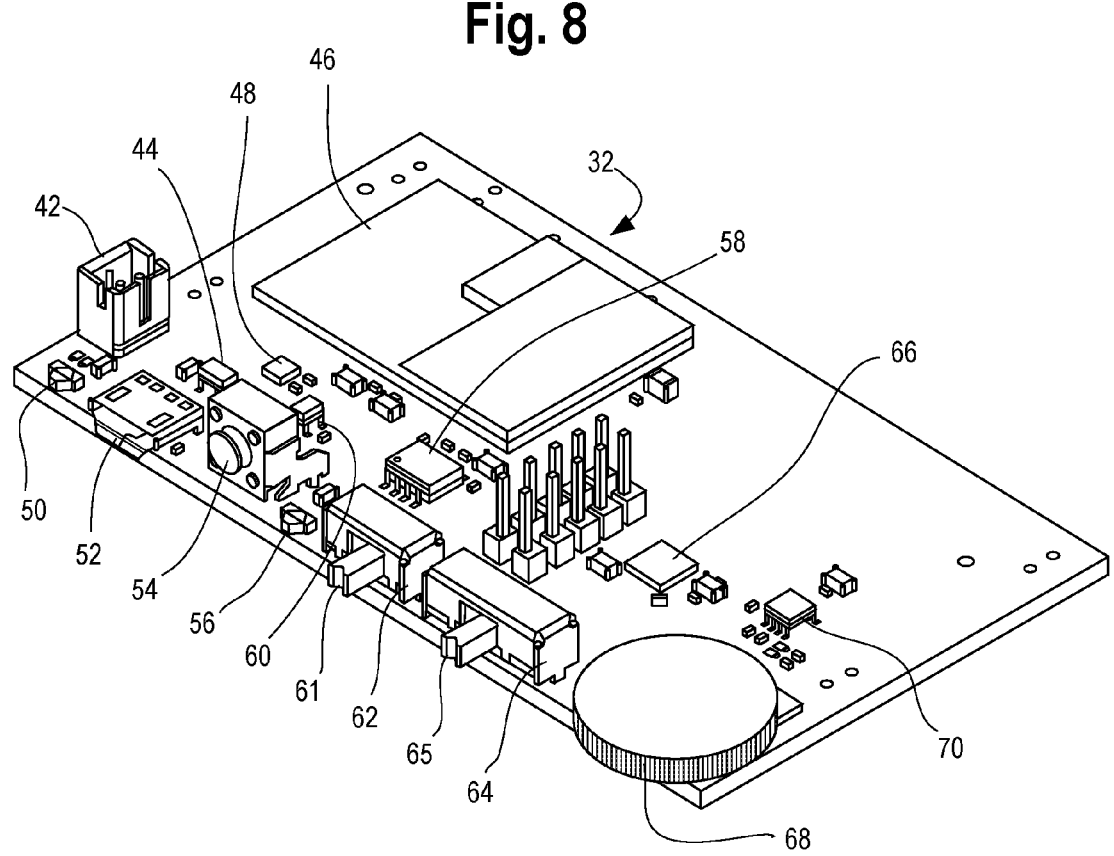
FIG. 8 is a perspective view, as viewed from the top, of the printed circuit board of Applicant's device.
Figure 9B:
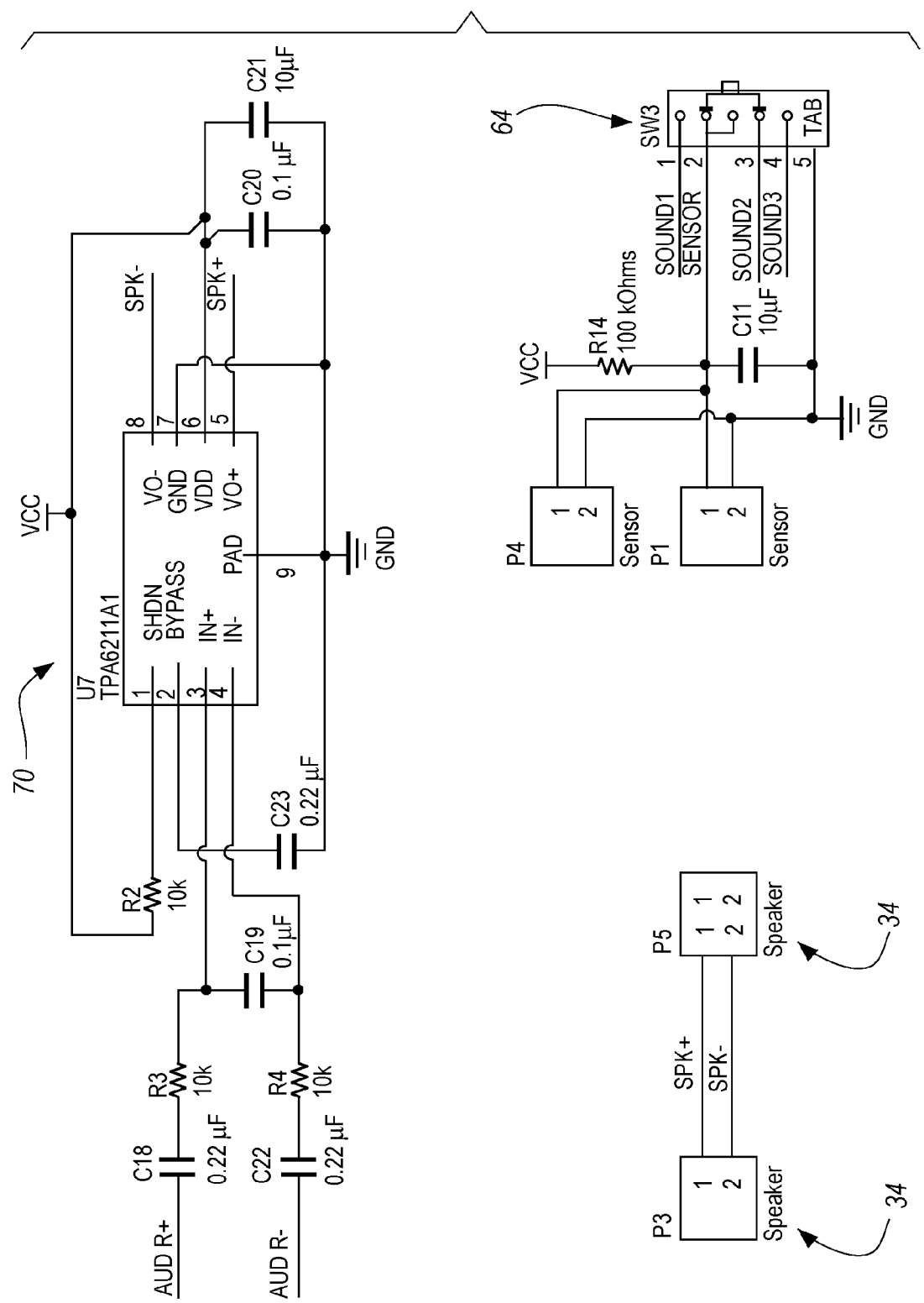
Figure 9C:
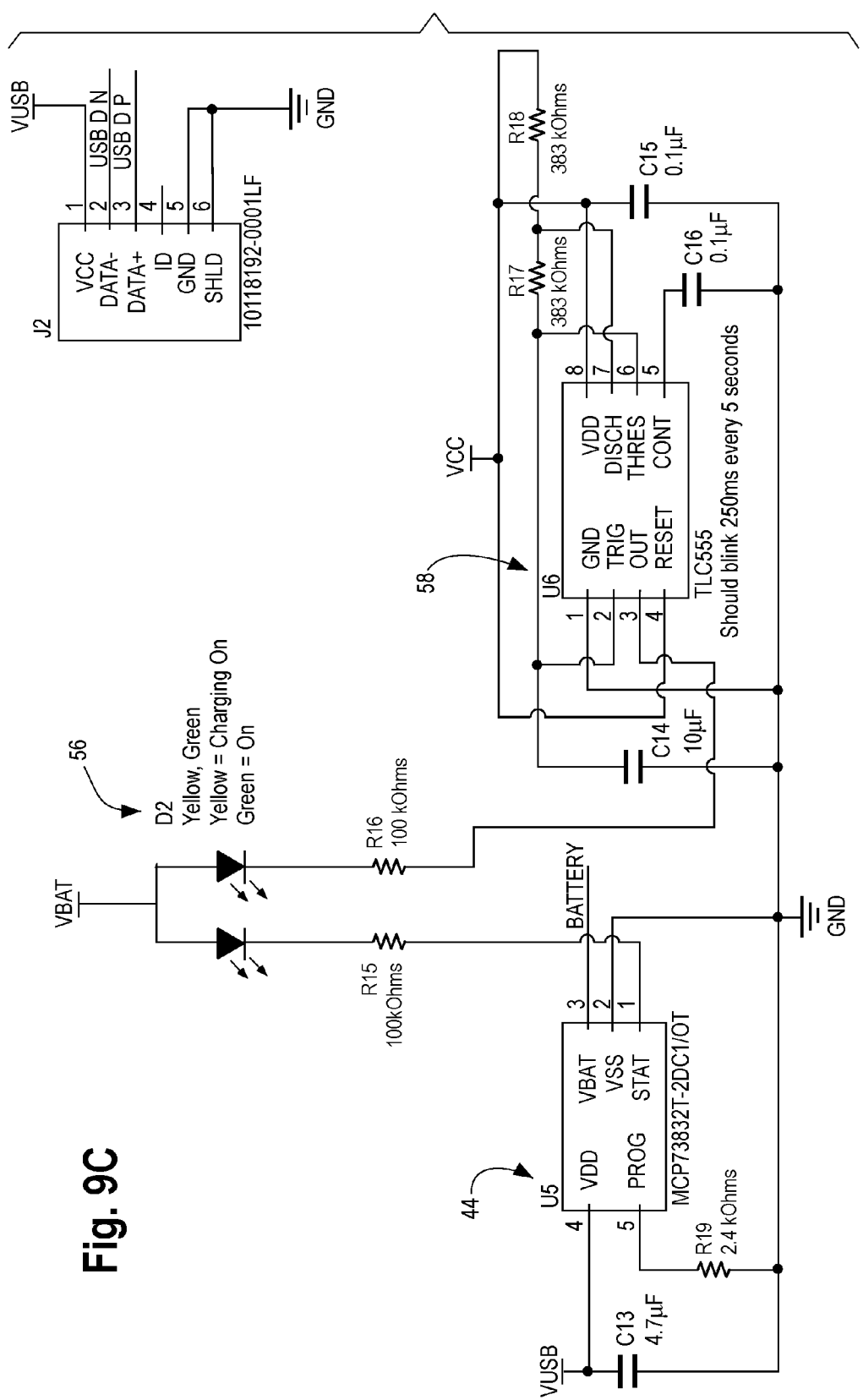
Figure 9D:
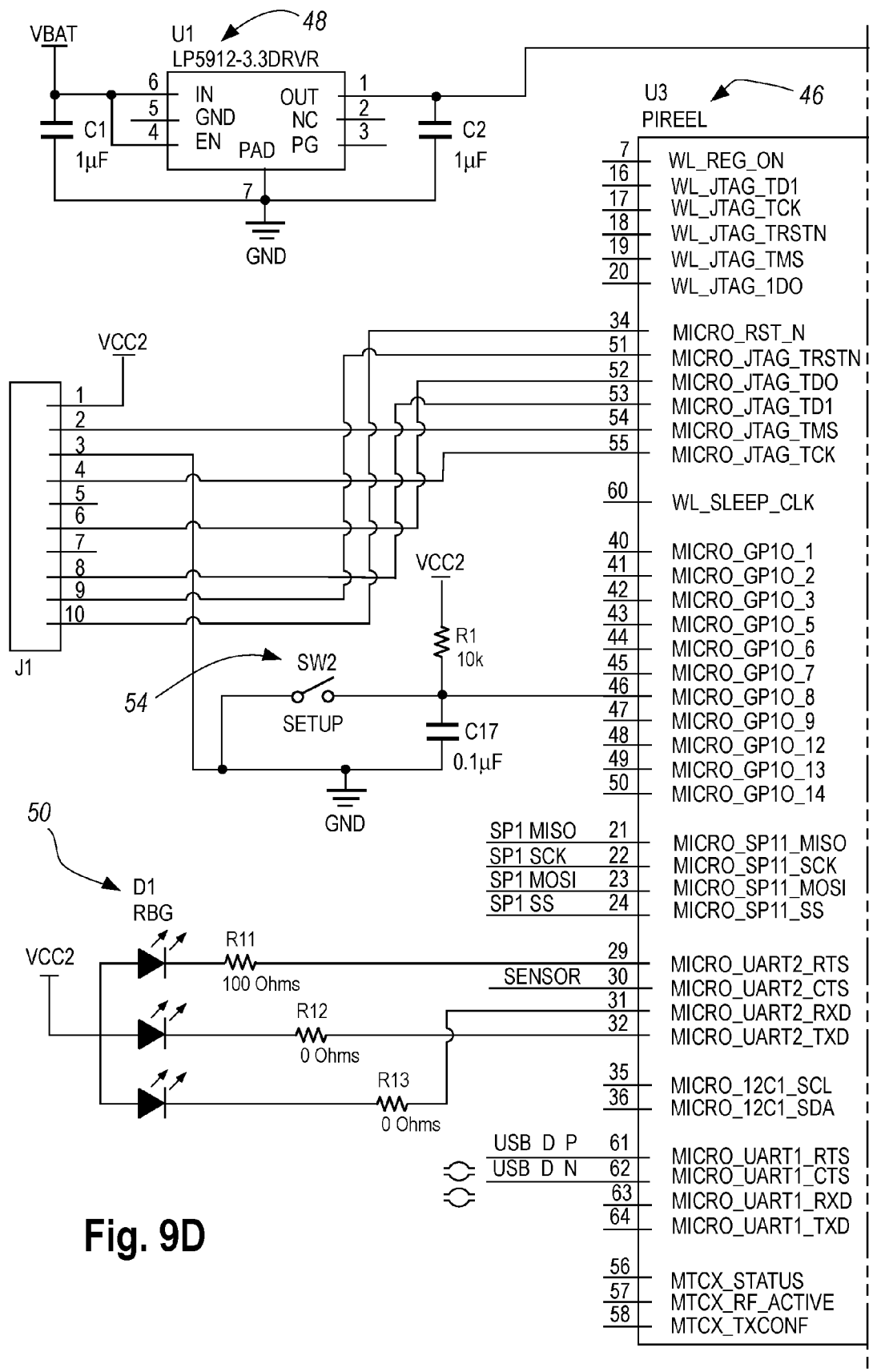

The main printed circuit board 32 mechanically supports and electrically connects the electronic components of the device 20 and, in particular, the printed circuit board 36 associated with the use of each of the plurality of feet 26, using conductive tracks, pads and other features etched from copper sheets laminated onto a non-conductive substrate. As illustrated in FIG. 8, the main printed circuit board 32 comprises the following: a rechargeable battery 42, a battery charger 44, a wireless chip 46, a power supply 48 for the wireless chip 46, a light emitting diode 50 for wireless chip 46, an electrical plug-in 52, a button 54 for actuating between wireless networks (e.g., Bluetooth, BLE or WIFI), a light emitting diode 56 for indicating power to device 20, a controller 58 for controlling the light emitting diode 56, a power supply 60 for audio, a power switch 62 having a power lever 61 for actuating between the power on and power off for the device 20, a sound switch 64 having a power lever 65 for actuating between pre-programmed audio sounds, a data chip 66 for storing pre-programmed audio files producing the audio sounds, a volume control dial 68, and an audio amplifier 70 for amplifying the audio sounds corresponding to the volume control dial 68.

Also, these printed circuit board components are well known in the art and it is contemplated that any compatible type, version, or size made by any manufacturer and applicable software for the printed circuit board and these components to interface or communicate with one another and Applicant's device known to one skilled in the art is acceptable to accomplish the intended purposes of Applicant's invention. Likewise, all of the electrical schematics for each of these components are specifically illustrated in FIGS. 9A through 9E.

Figure 5:
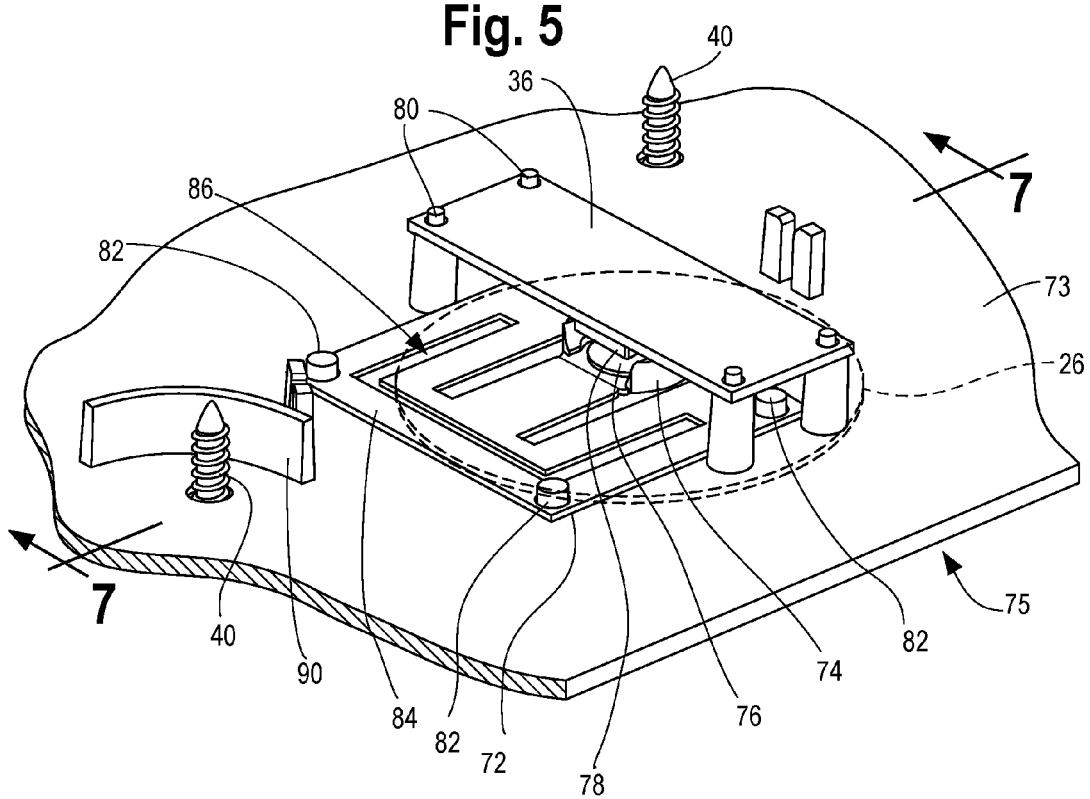
FIG. 5 is a perspective view, as viewed from the top, of the one of the plurality of feet used in connection with Applicant's device.
Figure 6:
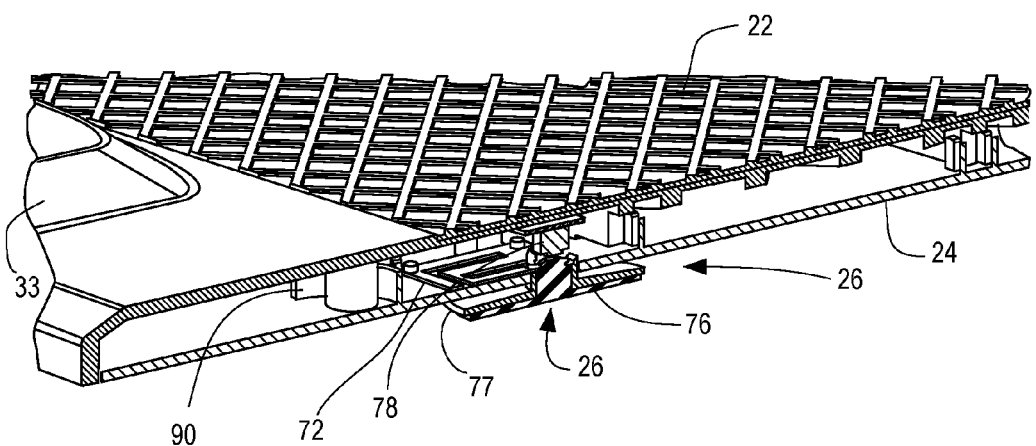
FIG. 6 is a perspective, cross-sectional view of Applicant's device and, in particular, illustrating one of the plurality of feet in its assembled form within the device and between the top panel and the bottom panel.
Figure 7:
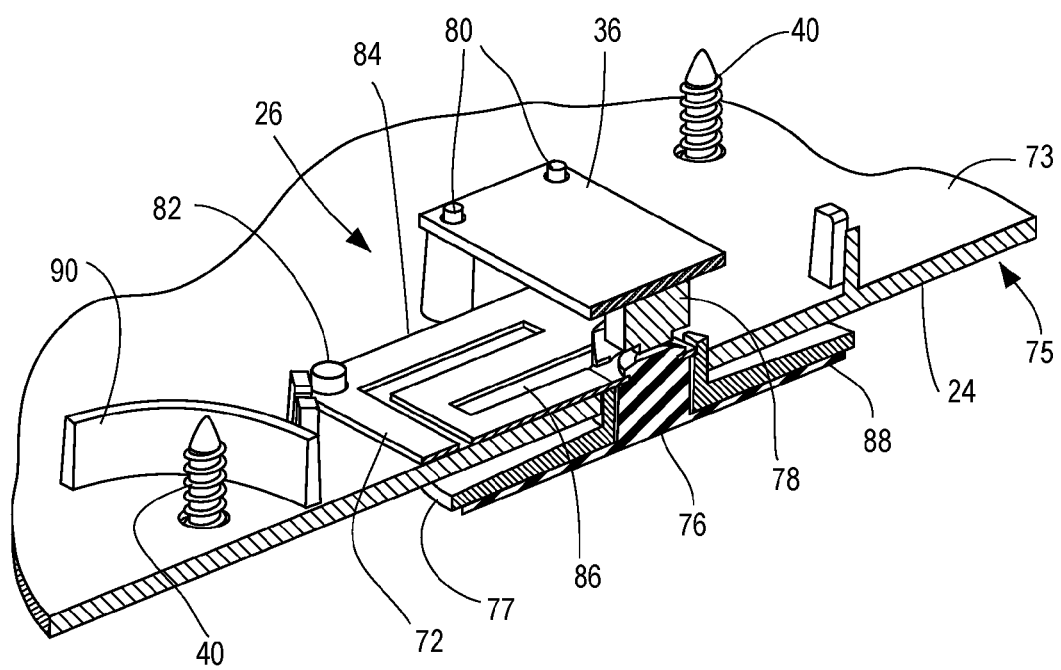
FIG. 7 is a perspective, cross-sectional view, taken along line 7-7 of FIG. 5, of one of the plurality of feet.

Turning to FIGS. 5 through 7, the plurality of feet 26 are more clearly illustrated. Each of the plurality of feet 26 comprise a spring 72, a plastic retaining wall 74, a rubber insert 76, a base 77, an activation button 78, and mounting posts 80 engagedly supporting the printed circuit board 36.

In the preferred embodiment, the spring 72 is fixedly secured to the interior 73 of the bottom panel 24 by any fastener 82 known to one skilled in the art. While the spring 72 is secured along its edges, the main body 84 and open channels 86 permit the spring 72 to remain flexible to accommodate the movement/compression of the rubber insert 76.

Located within the center of the plastic retaining wall 74 is the rubber insert 76. This rubber insert 76 extends through the spring 72 from the interior 73 of the bottom panel 24, through the bottom panel 24, and out the exterior 75 of the bottom panel 24. The rubber insert 76 is fitted or covered by a base 77 with a portion 88 of the rubber insert 76 remaining exposed and designed to engage the floor or ground. In this manner, each of the plurality of feet 26 engage the floor or ground supporting the device 20.

Situated or in direct alignment above the rubber insert 76 is the button 78 which is provided with an electrical connection to the printed circuit board 36. The electrical connection to the printed circuit board 36 is well known and can be accomplished by any means known to one skilled in the art.

A guiding wall 90 is also located adjacent to the plurality of feet 26 and is used as a means for assistance in guiding the electrical wires between the printed circuit board 36 and the main printed circuit board 32.

In use, the device 20, upon actuating the power lever 61, is toggled from the "off" position to the "on" position. The device 20 may be powered by a separate electrical source connected to the electrical socket 52 or, if not connected to a power source, then by the battery 42, as supported by the battery charger 44.

The light emitting diode 56 then indicates, through a blinking or solid light, that the device 20 is turned "on." For example, the light emitting diode 56 may blink in a green light every five to ten seconds to indicate that the device 20 is turned "on"; and may be in a solid yellow light to indicate that the device 20 is charging. Alternatively, the light emitting diode 56 may be programmed in any light, blinking or solid, are any combination thereof as desired.

The light emitting diode 50 likewise then indicates, through a blinking or solid light, that the device 20 is, or is not, wireless connected. For example, the light emitting diode 50 may blink in a blue light every five to ten seconds to indicate that the device 20 is wirelessly connected to a separate device; and may be in a solid red light to indicate that the device 20 is not wirelessly connected to a separate device. Alternatively, the light emitting diode 50 may be programmed in any light, blinking or solid, are any combination thereof as desired. If the light emitting diode 50 is indicating that the device 20 is not wirelessly connected to a separate device, then the button 54, using the wireless chip 46, is used to communicate with and select or change the wireless network with the owner's smart phone or any other electronic device used by the owner.

Upon actuating the sound lever 65 of the sound switch 64, can toggle between any of the plurality of pre-programmed audio sounds stored on the data chip 66. Upon the sound lever 65 being positioned as desired, the pre-programmed audio sound corresponding to that location will be chosen ("the selected pre-programmed audio sound"). In the preferred embodiment, the sound lever 65 of the sound switch 64 can toggle between the plurality of pre-programmed audio sounds of at least three. Alternatively, the pre-programmed audio sounds stored on the data chip 66 and available to be toggled between using the sound lever 65 of the sound switch 64 may be a minimum of one to as many as desired that can be accommodated with the device 20.

Also, upon rotating the volume control 68 at any time, either in the clockwise or counter-clockwise direction, will set or change the desired volume level of the selected pre-programmed audio sound. The volume also includes a mute or silent mode or non-silent mode.

The device 20 begins in a dormant state. Then, when the pet 28 (see FIG. 1) needs to go outside and stands on, positions, engages or applies pressure to the top panel 22 of the device 20, the weight or pressure of the pet 28 causes the spring 72 to flex and the rubber insert 76 in one or more of the plurality of feet 26 to compress. In this preferred embodiment, except for the movement within the plurality of feet 26, the entire device 20 remains fixed. Upon the compression of the rubber insert 76, the entire device 20 becomes lowered at one or more of these plurality of feet 26 that are affected. With the lowering of the entire device 20, the button 78 engages the rubber insert 76.

In an alternate embodiment, as disclosed in the U.S. Provisional Patent Application, Ser. No. 62/296,984, the device 20 may be provided with two pressure sensitive contact surfaces housed, and spaced apart, within the device 20 or between the top panel 22 and the bottom panel 24, where the device 20 is no longer fixed but flexible. Thus, when the pet 28 (see FIG. 1) needs to go outside and stands on, positions, engages or applies pressure to the top panel 22 of the device 20, the weight or pressure of the pet 28 causes the device 20 to flex and the two pressure sensitive contact surfaces to come in contact with one another. In this manner, this contact will close the circuit between the two pressure sensitive contact surfaces to send the electrical signal to the main printed circuit board 32.

At this point, the device 20 has changed from the dormant state to a state under weight or state under pressure. Upon this change in state, the device 20 is then activated and begins the communication. The button 78 communicates with the printed circuit board 36 to close the circuit. The printed circuit board 36 then sends an electrical signal to the main printed circuit board 32.

Upon receipt, the main printed circuit board 32, the selected pre-programmed audio sound is, using the audio amplifier 70 and, in the non-silent mode, at the volume set by the volume control 68, produced the sound alert through the speakers 34; a wireless notification (e.g., such as a push notification, e-mail, or any other type of wireless notification known to one skilled in the art) is transmitted to the smart phone or other electronic device (e.g., software program or application, etc. . . . ); or one or both, as desired. For example, if the volume control 68 is set or changed to the mute or silent mode (i.e, perhaps a particular pet does not respond well to any of the pre-programmed audio sounds or any sounds at all), the wireless notification may be preferable in these or other types of situations. This then provides an alert or notice to the owner that the pet is located at the device 20 and needs to leave the house or go outside.

Also, in the preferred embodiment, the selected pre-programmed audio sound is repeated, at any interval desired, until the pet 28 and jumps off and dis-engages the top panel 22 of the device 20.

When the alert or notification is received by the owner and/or the pet 28 jumps off and dis-engages or releasing the pressure to the top panel 22 of the device 20, the weight or pressure of the pet 28 is released causing the device 20 to change from the state under weight or state under pressure back to the dormant state.

In the preferred embodiment, the spring 72 de-flexes and the rubber insert 76 in one or more of the affected plurality of feet 26 de-compresses. Upon the de-compression of the rubber insert 76, the entire device 20 becomes raised, at one or more of these plurality of feet 26 that were affected, back to its original position. With the raising of the entire device 20, the button 78 dis-engages the rubber insert 76. Upon this dis-engagement or release of pressure, the button 78 communicates with the printed circuit board 36 to open the circuit such that the printed circuit board 36 discontinues or stop sending the electrical signal to the main printed circuit board 32.

In an alternate embodiment, as disclosed in the U.S. Provisional Patent Application, Ser. No. 62/296,984, the dis-engaging or release of the pressure to the top panel 22 of the device 20 causes the two pressure sensitive contact surfaces to separate from one another opening the circuit and thereby discontinue or stop sending the electrical signal to the main printed circuit board 32.

At this point, the device 20 is back to its original or dormant state.

In an alternate embodiment, Applicant's device 20 this system as described can also be used in the same manner as an alarm/alert/notification system in connection with, for example, nursing homes by its residents which would provide the care-givers constant monitoring capabilities of the residents at minimal cost; or toddlers and infants whereby the device 20 may be positioned in areas that are out of bounds to the toddlers or infants; or in any other manner where such an alarm/alert/notification would be beneficial.

In addition to the disclosures above, Applicant's device 20 is designed: with a low profile for easy positioning and can accommodate any size; may be provided with a pressure sensitivity pad (instead of the plurality of feet 26) for actuating to close the circuit with the printed circuit board 36; may be designed in any materials and colors to match the decor of the interior of the house, as desired; may be provided with non a slip bottom surface to maintain position of the device 20 on the floor or ground; and is of high quality material that is easy to clean and wipe down.

Thus, there has been provided an electronic sensing device used to detect the presence of a pet thereon and emit a communication (through an alert or other notification) to the pet's owner of the pet's need to leave the house or go outside. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method for communicating an alert from a device supported by a plurality of feet, comprising the steps of:
    selecting one of a plurality of pre-programmed audio sounds, defining a selected pre-programmed audio sound;
    causing the device to change from a dormant state to a state under weight upon a domestic pet engaging the device;
    while in the dormant state:
        providing a top panel and a bottom panel for creating a housing of the device, the housing being non-deformable;
        providing an access hole in the bottom panel:
        providing a button within the housing of the device, the button having an electrical connection to a printed circuit board;
        providing a compressible insert within the plurality of feet, the compressible insert extending from within the plurality of feet through the access hole in the bottom panel and into the housing of the device;
    while in the state under weight:
        compressing the insert in at least one of the plurality of feet;
        lowering the housing and the button in relation to the plurality of feet;
        causing the button to come in contact with the insert in at least one of the plurality of feet;
        closing the circuit and causing the device to activate; and
        communicating the alert by causing the selected pre-programmed audio sound to be produced;
    receiving the alert;
    dis-engaging the domestic pet from the device;
    causing the device to change from the state under weight back to the dormant state;
    while in the dormant state:
        causing the device to de-activate; and
        causing the selected pre-programmed audio sound to stop.

2. The method of claim 1 and further comprising the step of storing the pre-programmed audio sounds in the device.

3. The method of claim 1 and further comprising the step of selecting a volume level for the selected pre-programmed audio sound.

4. The method of claim 3 and further comprising the step of providing the volume level consisting of silent and non-silent.

5. The method of claim 1 and further comprising the step of causing the selected pre-programmed audio sound to be repeatedly produced in timed intervals.

6. The method of claim 1 and further comprising the step of wirelessly connecting the device to a second device.

7. The method of claim 6 and further comprising the step of, while in the state under weight, communicating, a second alert by causing a wireless notification to be transmitted to the second device.

8. The method of claim 1 and further comprising the step of providing the wireless notification consisting essentially of a push notification and e-mail.

9. A method for communicating an alert from a device, comprising the steps of:

selecting one of a plurality of pre-programmed audio sounds, defining a selected pre-programmed audio sound;

applying pressure to the device causing the device to change from a dormant state to a state under pressure;

while in the dormant state:
  providing a device having a top panel and a bottom panel separated by an opening;
  providing an access hole in the bottom panel:
  providing a button within the opening, the button having an electrical connection to a printed circuit board;
  providing a support for the device;
  providing a compressible insert inside the support, the compressible insert extending from inside the support through the access hole in the bottom panel and into the opening;

while in the state under pressure:
  compressing the insert in at least one of the plurality of feet;
  lowering the top panel, lowering the bottom panel, and lowering the button in relation to the support, the lowering of each of the top panel, the bottom panel, and the button being substantially the same with the top panel and the bottom panel each remaining substantially fixed in relation to one another;
  causing the button to come in contact with the insert in the at least one of the plurality of feet;
  closing the circuit and causing the device to activate; and
  communicating the alert by causing the selected pre-programmed audio sound to be produced;

receiving the alert;

releasing the pressure to the device causing the device to change from the state under pressure back to the dormant state;

while in the dormant state:
  causing the device to de-activate; and
  causing the selected pre-programmed audio sound to stop.

10. The method of claim 9 and further comprising the step of storing the pre-programmed audio sounds in the device.

11. The method of claim 9 and further comprising the step of selecting a volume level for the selected pre-programmed audio sound.

12. The method of claim 11 and further comprising the step of providing a volume level consisting of silent or non-silent.

13. The method of claim 9 and further comprising the step of causing the selected, pre-programmed audio sound to be repeatedly produced in timed intervals.

14. The method of claim 9 and further comprising the step of wirelessly connecting the device to a second device.

15. The method of claim 14 and further comprising the step of, while in the state under pressure, communicating a second alert by causing a wireless notification to be transmitted to the second device.

16. The method of claim 9 and further comprising the step of providing the wireless notification consisting essentially of a push notification and e-mail.

17. A method for communicating an alert from a device supported by a plurality of feet, comprising the steps of:
  if the device is to be used, then performing the following steps (a) - (b):
    (a) selecting one of a plurality of pre-programmed audio sounds, defining a selected pre-programmed audio sound;
    (b) wirelessly connecting the device to a second device;
  if the device is caused to change from a dominant state to a state under weight upon a domestic pet engaging the device, then performing the following steps (c) - (f):
    (c) defining an open housing of the device, the housing having a bottom panel further providing an access hole;
    (d) providing a button within the housing of the device, the button having an electrical connection to a printed circuit board;
    (e) providing a compressible material inside the plurality of feet, the material further extending from inside the plurality of feet through the access hole in the bottom panel and into the opening of the housing of the device;
    (f) compressing the material in at least one of the plurality of feet;
    (g) lowering the housing and the button in relation to the plurality of feet;
    (h) causing the button to engage with the material in the at least one of the plurality of feet;
    (i) closing the circuit and causing the device to activate; and
    (j) communicating the alert by causing the selected pre-programmed audio sound to be produced;
    (k) communicating a second alert by causing a wireless notification to be transmitted to the second device
  receiving the alert;
  if the domestic pet is dis-engaged from the device causing the device to change from the state under weight back to the dormant state, then performing the following steps (g) - (i):
    (l) causing one or more of the plurality of feet to de-compress;
    (m) causing the device to de-activate; and
    (n) causing the selected pre-programmed audio sound to stop.

* * * * *

UNITED STATES PATENT AND TRADEMARK OFFICE
CERTIFICATE OF CORRECTION

PATENT NO. : 10,034,457 B2
APPLICATION NO. : 15/435909
DATED : July 31, 2018
INVENTOR(S) : Jenna Swartz Page 1 of 1

It is certified that error appears in the above-identified patent and that said Letters Patent is hereby corrected as shown below:

In Column 8, Claim 17, Line 17, please delete the word "dominant" and insert the word --dormant--.

Signed and Sealed this
Twenty-fifth Day of September, 2018

Andrei Iancu
*Director of the United States Patent and Trademark Office*